(12) United States Patent
Zbinden et al.

(10) Patent No.: US 6,947,229 B2
(45) Date of Patent: Sep. 20, 2005

(54) ETALON POSITIONING USING SOLDER BALLS

(75) Inventors: Eric J. Zbinden, Mountain View, CA (US); Marc Epitaux, Sunnyvale, CA (US); Tea H. Nim, Orange, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 10/742,713

(22) Filed: Dec. 19, 2003

(65) Prior Publication Data

US 2005/0134975 A1    Jun. 23, 2005

(51) Int. Cl.⁷ .............................. G02B 7/02; G02F 1/03; H01S 3/10; B23Q 17/00; H01L 21/00
(52) U.S. Cl. .................. 359/819; 359/260; 372/20; 372/22; 29/407.04; 438/106
(58) Field of Search .................. 359/819, 820, 359/822, 260; 29/407.04, 407.05; 372/19, 372/20, 97, 22, 98; 438/106, 110; 398/82

(56) References Cited

U.S. PATENT DOCUMENTS

| | | | |
|---|---|---|---|
| 3,498,693 A | * | 3/1970 | Joseph et al. ............... 359/317 |
| 5,119,240 A | | 6/1992 | Marion et al. |
| 5,128,798 A | * | 7/1992 | Bowen et al. ............... 359/260 |
| 5,631,987 A | | 5/1997 | Lasky et al. |
| 5,798,859 A | * | 8/1998 | Colbourne et al. ......... 359/247 |
| 6,205,159 B1 | * | 3/2001 | Sesko et al. .................. 372/20 |
| 6,543,114 B2 | * | 4/2003 | Atia et al. ............... 29/407.04 |
| 6,625,372 B1 | | 9/2003 | Flanders et al. |
| 6,661,815 B1 | | 12/2003 | Kozlovsky et al. |
| 6,764,875 B2 | * | 7/2004 | Shook ........................ 438/106 |

OTHER PUBLICATIONS

PCT Search Report and Written Opinion.

* cited by examiner

Primary Examiner—Loha Ben
(74) Attorney, Agent, or Firm—Kevin A. Reif

(57) ABSTRACT

Two etalons in series may be angled to reduce parasitic reflections in the space between the two. The etalons may be soldered on either side of a post having an aperture there through to allow light to pass. Various sized solder balls and/or solder pads may be used to create the desired angle and to secure the etalons to the post. Alternatively, a lip on the post may create the desired angle. Once secured to the post, rather than aligning the etalons by pick and place methods individually, the post and attached etalons may be secured as a single unit to an optical system, such as within the cavity of an external cavity diode laser (ECDL).

37 Claims, 5 Drawing Sheets

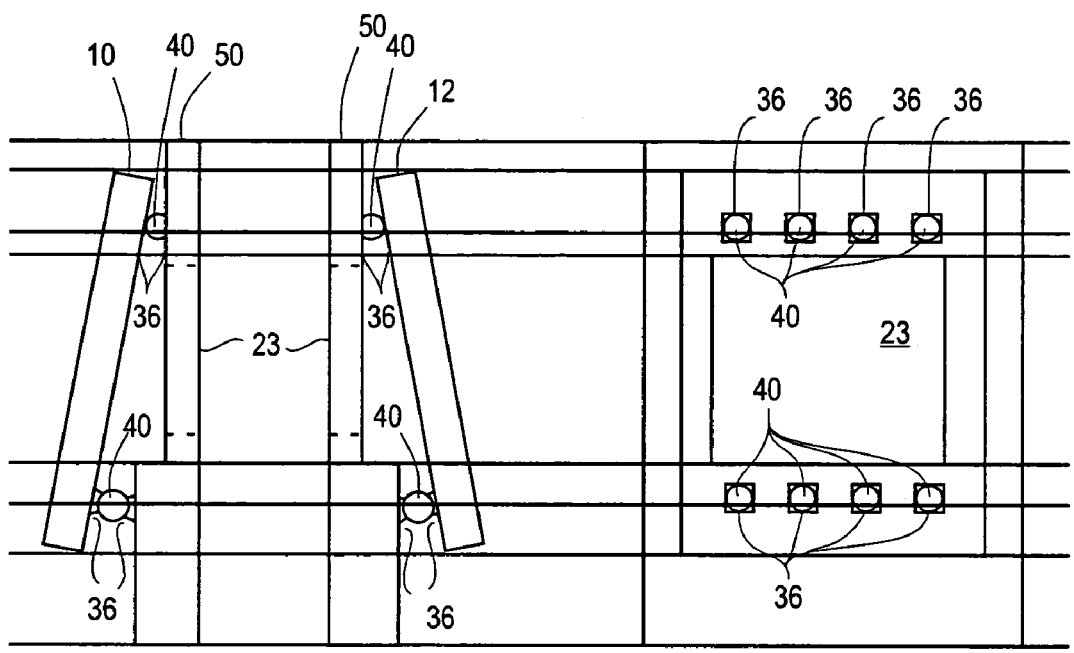
Side View
FIG. 3A
Front View
FIG. 3B
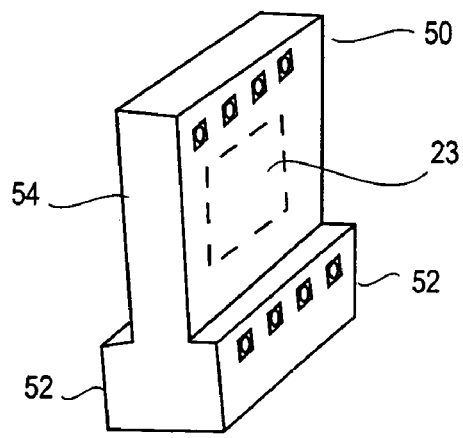
FIG. 3C

_(1)_

ETALON POSITIONING USING SOLDER BALLS

FIELD OF THE INVENTION

Embodiments of the present invention relate to positioning techniques and, more particularly, to positioning etalons using solder balls.

BACKGROUND INFORMATION

Fiberoptic telecommunications are continually subject to demand for increased bandwidth. One way that bandwidth expansion has been accomplished is through dense wavelength division multiplexing (DWDM) wherein multiple separate data streams exist concurrently in a single optical fiber, with modulation of each data stream occurring on a different channel. Each data stream is modulated onto the output beam of a corresponding semiconductor transmitter laser operating at a specific channel wavelength, and the modulated outputs from the semiconductor lasers are combined onto a single fiber for transmission in their respective channels. The International Telecommunications Union (ITU) presently requires channel separations of 50 GHz, or approximately 0.4 nanometers. This channel separation allows up to 128 channels to be carried by a single fiber within the bandwidth range of currently available fibers and fiber amplifiers. Improvements in fiber technology together with the ever-increasing demand for greater bandwidth will likely result in smaller channel separation in the future.

Transmitter lasers used in DWDM systems have typically been based on distributed feedback (DFB) lasers operating with a reference etalon associated in a feedback control loop, with the reference etalon defining the ITU wavelength grid. Statistical variation associated with the manufacture of individual DFB lasers results in a distribution of channel center wavelengths across the wavelength grid, and thus individual DFB transmitters are usable only for a single channel or a small number of adjacent channels. Continuously tunable external cavity lasers have been developed to overcome this problem.

The trend towards smaller channel separation and the advent of channel selectivity in transmitter lasers has given rise to a need for greater accuracy and control in the positioning of tunable elements associated with transmitter lasers. As tunable elements are configured for narrower channel separation, decreasing component tolerances and thermal fluctuation become increasingly important. Non-optimal positioning of tunable elements results in spatial losses and reduced transmitter output power.

An etalon is a widely used tunable element that acts to filter specific frequencies of light. An etalon is a type of interference filter in which the intensity of transmitted light is dependent on its wavelength. An etalon is generally comprised of two partially reflective parallel surfaces spaced a distance apart and separated by a material. The material may be glass plates or similar material having a reflective or partially reflective coating and the partially reflective surfaces are the interface of that material with the surrounding environment. When collimated light of a certain wavelength passes through the etalon some of the light is reflected between the surfaces. Constructive and/or destructive interference of light beams within the space between the surfaces occurs and attenuates unwanted wavelengths preventing them from passing through the etalon.

BRIEF DESCRIPTION OF THE DRAWINGS

FIGS. 3A, 3B, and 3C are a side view, front view and isometric view, respectively, of an etalon positioning technique according to another embodiment of the invention;

DETAILED DESCRIPTION

One of the major challenges in the optoelectronic assembly process is to couple light from one component to another while maintaining tight tolerances. Further, measures should be taken to prevent light entering one component in the optical path from being reflected back to a previous component in the optical path. In brief, the alignment process can generally be summarized in just a couple of steps.

First, a component is aligned relative to another or to a light beam. Tight tolerances are specified. Second, the components must be bonded or otherwise secured to a surface while being careful to keep the alignment. Finally, the assembly needs to be reliable. That is, the finished assembly including the bonding must be stable under temperature cycling, aging, shock, vibration, and any other condition that the assembly may reasonably be expected to encounter.

For many applications two or more etalons may be positioned in series in the optical path. A problem may arise in that light may be reflected back and forth in the space or cavity between the two etalons leading to a parasitic effect. A solution to this situation may be to orient the etalons at a slight angle relative to one another. This tends to mitigate the unwanted reflection.

Figure 1:
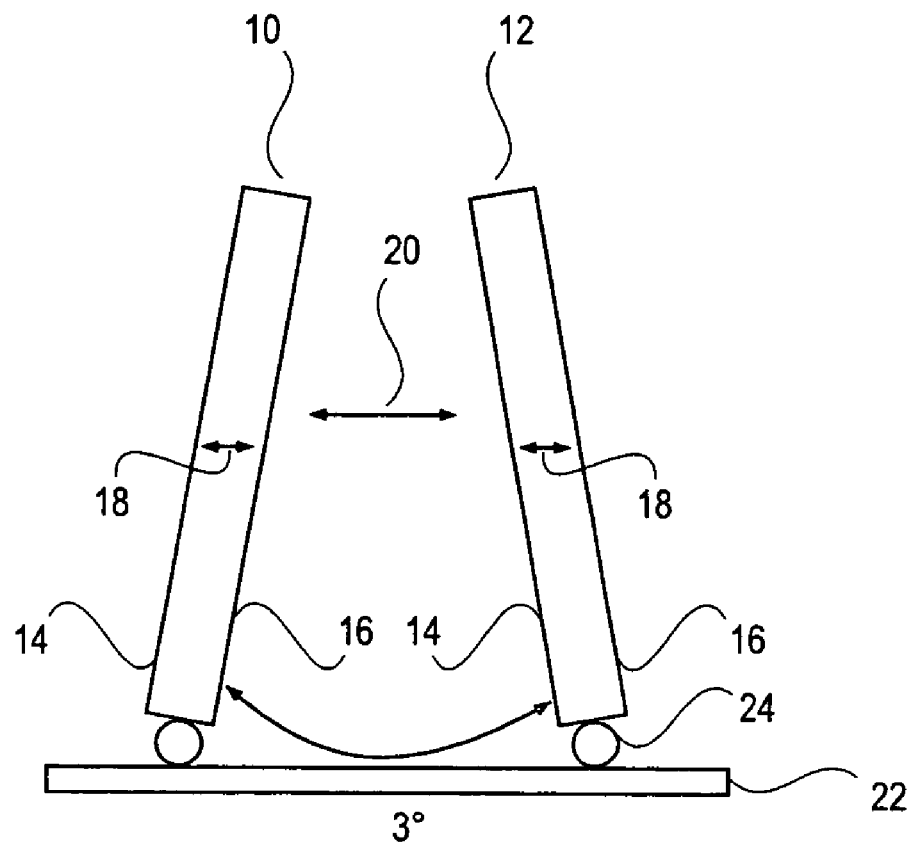
FIG. 1 is a view of two etalons secured to a substrate at an angle.

FIG. 1 shows two etalons 10 and 12. Each etalon 10 and 12 is made of a transparent medium such as glass, and comprises two fixed parallel surfaces 14 and 16, on which is may be a reflective coating. A light beam that enters the first plate through interface 16 has rays either reflected off the surface or transmitted through. A ray that enters then goes through the bulk material 18 to the next interface 14. Once there, the ray will either be transmitted or reflected. If reflected it will be redirected back to the first interface 16 and the same event, of transmission or reflection, will occur. The bulk material distance 18 between the two interfaces is such that constructive interference will occur with a specific wavelength that coincides with double the distance between the interfaces. The other wavelengths will act destructively with other reflections and so only the desired wavelength is transmitted through the etalon.

When two etalons arranged in series are oriented parallel to each other, parasitic reflections may occur in the cavity 20 between the two etalons 10 and 12 leading to instabilities in the laser device. A method to mitigate this parasitic reflection may be to place the etalons at a slight angle to one another as shown in FIG. 1. Here, the etalons 10 and 12 are oriented at a 3 degree angle (e.g., each etalon is oriented at 1.5 degrees from vertical). This angle is by way of example only as in practice the angle may be more or less depending on the application.

Generally etalons are oriented by pick and place techniques within a laser cavity. That is, the etalons 10 and 12 are placed at the desired angle relative to a substrate 22 and thereafter affixed in place by solder 24 or some other method. This may be a time consuming and delicate task.

Solders are special composition metals (known as alloys) that melt at relatively low temperatures (120–450° C.), and wet the surrounding materials. The most commonly used solders contain tin and lead as base components. Many alloy variations exist that include two or more of the following metallic elements: tin (Sn), lead (Pb), silver (Ag), bismuth (Bi), antimony (Sb) and copper (Cu). Solder works by melting when it is heated (reflowed), and bonding to metallic surfaces. After resolidification, the solder forms a permanent intermetallic bond between the metals joined, essentially acting like a metal "glue." In addition to providing a bonding function, solder joints may also provide an electrical connection between soldered components and a heat transfer path. Solders are available in many forms including paste, wire, bar, ribbon, preforms and ingots.

Generally, metal surfaces have a thin film of oxidation or passivation caused by normal environmental exposure to air and oxygen that acts as a barrier during the soldering process. Accordingly, a chemical product (usually rosin-based) known as "flux" is used to prepare the metal surfaces for soldering by cleaning off oxides, passivation and other contamination. Flux also reduces the surface tension of the solder alloy to promote wetting out over exposed solderable surfaces beyond the initial deposit location. During the preheating stage, the flux is working and the alloy is approaching its melting point. Fluxless processes are also known. After the solder becomes completely molten, heat is removed to allow re-solidification of the alloy in its new position.

Figures 2A, 2B:
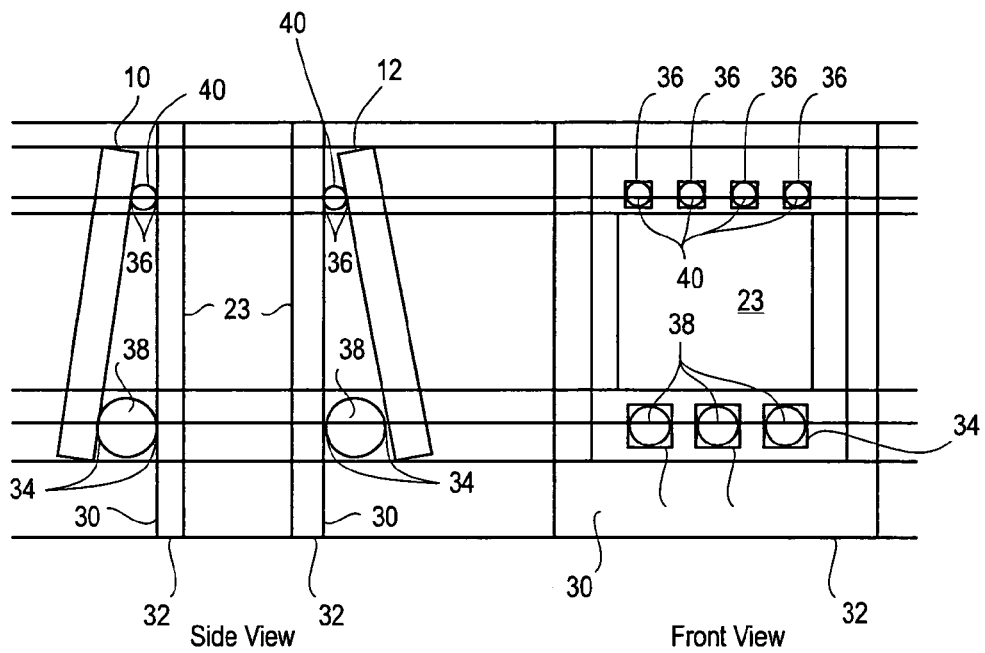
FIGS. 2A, 2B, and 2C are a side view, front view and isometric view, respectively, of an etalon positioning technique according to one embodiment of the invention.
Figure 2C:
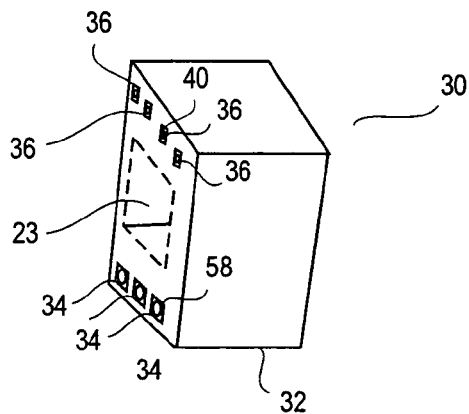

FIGS. 2A, 2B, and 2C show a solder technique for facilitating angled placement of the etalons 10 and 12. As shown, a post 30 has a base 32 that may be mounted normal to a substrate within the cavity of a laser device. The etalons 10 and 12 may be secured to either side of the post 30 in a mirror image fashion as shown. An aperture 23 in the post 30 allows light to pass freely through the post 30. The post 30 has a plurality of first sized solder pads 34 positioned along the bottom of either side of the post 30 and a plurality of second sized solder pads 36 positioned along the top of either side of the post 30. Corresponding rows of solder pads 34 and 36 may be positioned on the etalons 10 and 12. The post 30 may comprise a single unit as shown in FIG. 2C or may comprise two separate units separated by a distance as suggested in FIG. 2A.

The solder pads 34 and 36 may be sized to accommodate different sized solder balls in a solder ball array. Here, as shown in FIGS. 2A–2C, the solder pads 34 on the bottom row are larger than those solder pads 36 on the top row. Thus, when the etalons 10 and 12 are attached to the post 30, using larger solder balls 38 at the bottom of the post 30 and smaller solder balls 40 near the top of the post 30 tend to angle the etalons 10 and 12 relative to one another. The size of the pads 34 and 36 and thus the size of the solder balls 38 and 40 may be selected to create the desired angle. Since the solder balls 36 on the top row may be smaller, a greater number of solder balls 36 may be used to achieve the desire bonding strength.

Thus in one embodiment, the etalons 10 and 12 may be secured to the post 30 at the desired angle and then the post 30 with the etalons 10 and 12 attached may be secured within a laser cavity as a single unit thus eliminating the need to precisely pick and place the etalons 10 and 12 individually within the laser cavity. Furthermore the surface tension of the melted solder balls will automatically align the etalon relative to the post.

Referring to FIGS. 3A, 3B, and 3C, in another embodiment of the invention the post 50 to which the etalons 10 and 12 are secured has a lip portion 52 at one end of the post such that the bottom portion of the post is wider than the top portion 54. Again, an aperture 23 in the post 50 allows light to freely pass through the post 50 between the etalons 10 and 12. Thus, the solder pads 36 and thus the solder balls 40 on both the top and bottom rows may be similarly sized. In this instance, the widths of the top portion 54 and the bottom portion 52 of the post 50 are selected to achieve the desired angle for the etalons 10 and 12.

Figure 4:
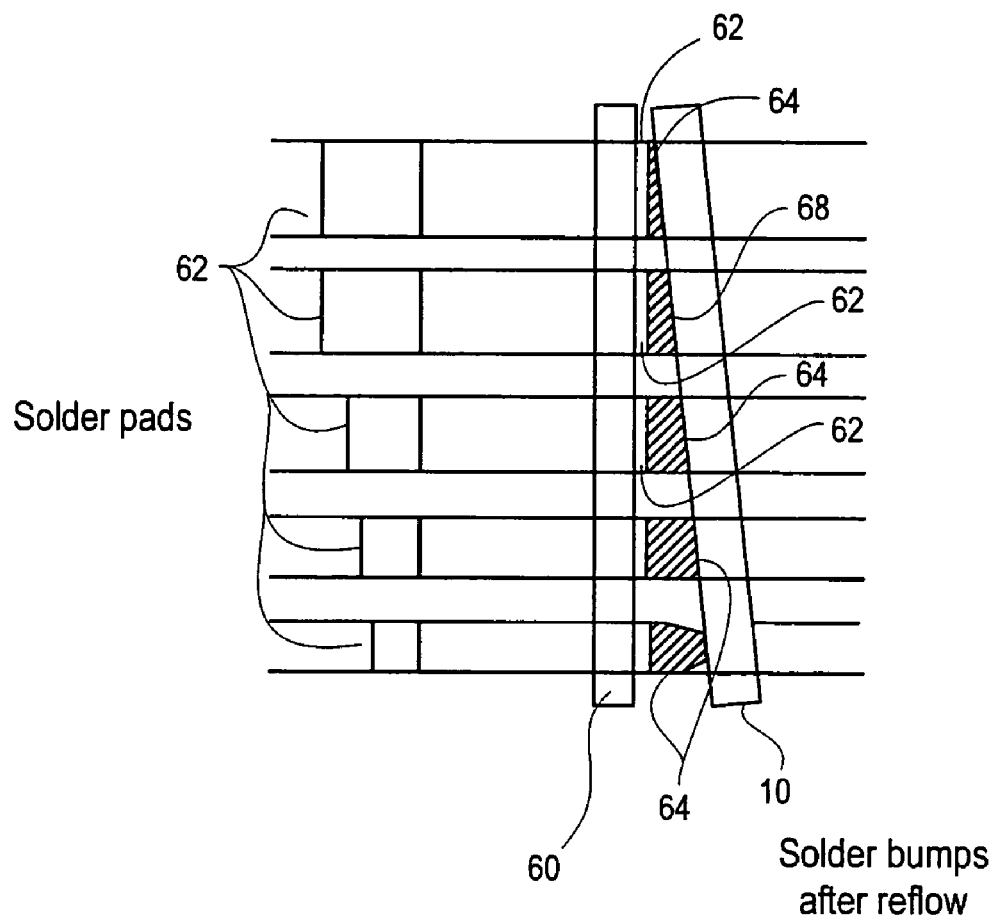
FIG. 4 is a side view of an etalon positioning technique according to yet another embodiment of the invention.

FIG. 4 shows yet another embodiment for positioning an etalon 10 at an angle relative to post 60. Here, solder pads 62 of progressively larger sizes are positioned on the post 60. Corresponding solder pads (not shown) may also be present on the etalon 10. The same sized solder balls (e.g., solder balls each having a same volume) 64 are placed on the solder pads 62. When the solder 64 is reflowed, it tends to wet its pad 62 and spread out over a greater area since the area of the pad 62 is larger. Thus, smaller pads 62 towards the bottom of the post 60 will secure the etalon 10 further away from the post 60 and the larger pads 62 towards the top of the post 60 will secure the etalon closer to the post 60. The post 60 may then be easily secured, for example within an ECDL, with the etalon 10 prepositioned at a desired angle.

Figure 5:
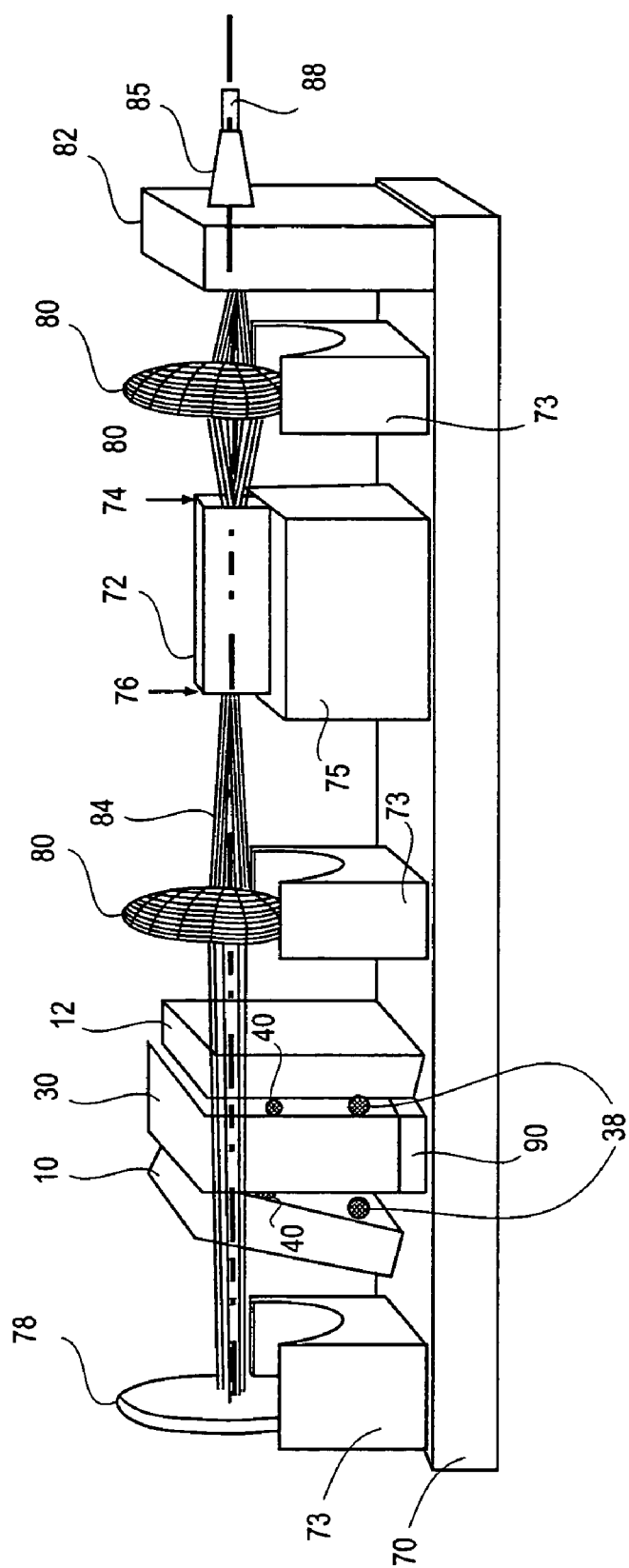
FIG. 5 is an isometric view of the etalon positioning technique according to embodiments of the invention shown in an external cavity laser diode (ECDL).

FIG. 5 is an example external cavity diode laser (ECDL) within which embodiments of the invention may be practiced. Various optical components are mounted on a substrate 70 via suitable mounts 73. A gain medium 72 may also be attached to a mount 75 secured to the substrate 70. The gain medium outputs a beam from both a front facet 74 and a rear facet 76. The front facet 74 is reflective while the back facet 76 is designed and coated to suppress or minimize back reflection inside the gain medium. The external cavity comprises the area between the front facet of the gain medium 74 and a reflector 78. Various optical components such as lenses 80 and filters 82 may also be present. A ferrule 85 may couple the fiber 88 to the ECDL. As shown, two etalons 10 and 12 may be positioned adjacent to one anther in the optical path 84. As previously discussed, it may be desirable to tilt or angle the etalons 10 and 12 from perpendicular with the optical path 84 in order to reduce parasitic reflections that may occur between the two etalons 10 and 12. According to embodiments of the invention, the etalons 10 and 12 may be previously secured to a post 30 with the solder ball array 38 technique herein described at the desired angle ad may facilitate automation of the process. Since this may be done outside of the cavity it may not be necessary to perfect the desired angle by less precise pick and place techniques. Thus, the post 30 and etalons 10 and 12 may be conveniently secured via solder, epoxy or other material 90 to the substrate 70 within the cavity as a single unit.

One skilled in the art will recognize that the above examples may be used for attachment of other optical components and non optical components that require mounting at an angle on a reference surface. Also one may use combinations of the above examples to achieve mounting a component at an angle relative to a reference surface or surfaces.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a post comprising a base and a first side substantially perpendicular to said base;
   an aperture through said post to allow light to pass;
   a first plurality of solder pads on said first side of said post;
   an optical component having a second plurality of solder pads corresponding to said first plurality of solder pads; and
   a plurality of solder balls to bond said first plurality of solder pads to said second plurality of solder pads to secure said optical component at an angle relative to said post.

2. The apparatus as recited in claim 1 wherein said optical component comprises an etalon.

3. The apparatus as recited in claim 2 wherein said post further comprises a second side being substantially a mirror image of said first side.

4. The apparatus as recited in claim 2 wherein said base is mounted to a substrate within a cavity of an external cavity diode laser (ECDL).

5. The apparatus as recited in claim 1 wherein said first plurality of solder pads and said second plurality of solder pads each comprise a first row and a second row parallel to said first row with one of said first row and second row accommodating larger solder balls.

6. The apparatus as recited in claim 1 further comprising:
   a lip on said post.

7. The apparatus as recited in claim 1 further comprising:
   a first row and a second row parallel to and at a distance of said first row with one of said first row and second row accommodating larger solder pads causing thickness of individual solder joints to vary and create an angle.

8. The apparatus as recited in claim 1 wherein said angle is approximately 1.5 degrees.

9. A method, comprising:
   providing a post having an aperture to allow light to pass through said post;
   positioning a first row of solder pads on first side of said post;
   positioning a second row of solder pads on said first side of said post at a distance and parallel to said first row;
   using first sized solder balls for said first row of solder pads to secure a first optical component to said post;
   using second sized solder balls for said second row of solder pads to secure the first optical component to said post; and
   wherein a size ratio between said first sized solder balls and said second sized solder balls holds the first optical component at an angle relative to said post.

10. The method as recited in claim 9 wherein one of said first sized solder balls and said second sized solder balls are larger than the other.

11. The method as recited in claim 9 wherein said first optical component comprises an etalon.

12. The method as recited in claim 11 wherein said angle comprises approximately 1.5 degrees.

13. The method as recited in claim 9 further comprising:
    positioning a third row of solder pads on a second side of said post;
    positioning a fourth row of solder pads on said second side of said post;
    using third sized solder balls for said third row of solder pads to secure a second optical component to said post;
    using fourth sized solder balls for said fourth row of solder pads to secure the second optical component to said post.

14. The method as recited in claim 13 wherein one of said third sized solder balls and said fourth sized solder balls are larger than the other.

15. The method as recited in claim 14 wherein said first optical component and said second optical component comprise etalons.

16. The method as recited in claim 15 further comprising:
    securing said post to a substrate in a cavity of an external cavity diode laser (ECDL).

17. A method, comprising:
    providing a post having an aperture to allow light to pass through said post;
    positioning a first row of first-sized solder pads on first side of said post;
    positioning a second row of second-sized solder pads on said first side of said post at a distance and parallel to said first row;
    using reflowed solder balls on said first-sized solder pads and said second-sized solder pads to secure a first optical component to said post;
    wherein a size ratio between said first sized solder pads and said second sized solder pads holds the first optical component at an angle relative to said post.

18. The method as recited in claim 17 wherein one of said first sized solder pads and said second sized solder pads are larger than the other.

19. The method as recited in claim 17 wherein said first optical component comprises an etalon.

20. The method as recited in claim 17 wherein said angle comprises approximately 1.5 degrees.

21. The method as recited in claim 17 further comprising:
    positioning a third row of third-sized solder pads on a second side of said post;
    positioning a fourth row of fourth-sized solder pads on said second side of said post;
    using reflowed solder balls on said third-sized solder pads and said fourth-sized solder pads to secure a second optical component to said post.

22. The method as recited in claim 21 wherein one of said third sized solder pads and said fourth sized solder pads are larger than the other.

23. The method as recited in claim 22 wherein said first optical component and said second optical component comprise etalons.

24. The method as recited in claim 17 further comprising:
    securing said post to a substrate in a cavity of an external cavity diode laser (ECDL).

25. A system for positioning etalons, comprising:
    a post having a first side and an opposite second side;
    an aperture through said first side and said second side allowing light to pass through said post;
    a first etalon soldered to said first side at a first angle to said post;

a second etalon soldered to said second side at a second angle to said post.

26. The system as recited in claim 25 further comprising: an external cavity diode laser (ECDL), said post positioned within said ECDL.

27. The system as recited in claim 25, further comprising: solder balls of different sizes to create said first angle and said second angle.

28. The system as recited in claim 25 further comprising: solder pads of different sizes to create said first angle and said second angle.

29. The system as recited in claim 25 further comprising: a lip on said post to create said first angle and said second angle.

30. An apparatus, comprising:
a first element with a first pattern of solder pads;
a second element to be mounted at an angle relative to said first element;
said second element having a second pattern of solder pads corresponding to said first pattern of solder pads, said second pattern of solder pads residing at a distance from said first pattern of solder pads with corresponding solder pads facing each other; and
said second element being attached to said first element by reflowed solder balls linking corresponding solder pads.

31. The apparatus of claim 30 where the angle of second element relative to said first element is achieved by providing pads of various dimensions to control spacing between corresponding individual solder pads.

32. The apparatus of claim 30 where the angle of second element relative to said first element is achieved by providing solder balls of various dimensions to control spacing between corresponding individual solder pads.

33. The apparatus of claim 30 where the angle of second element relative to said first element is achieved by having a lip on said first element.

34. A method comprising:
providing a first element having a first pattern of solder pads a second element having a second pattern of solder pads, said second pattern of solder pads corresponding to said first pattern of solder pads;
mounting said second element at an angle relative to said first element by reflowing solder balls between corresponding solder pads to create a set of solder joints; and
controlling said angle between second element and first element by controlling the thickness of individual solder joints between corresponding solder pads.

35. The method of claim 34 where the thickness of individual solder joints is achieved by controlling the aspect ratio of individual solder joints by varying the size of individual corresponding pairs of solder pads.

36. The method of claim 34 where thickness of individual solder joints is achieved by varying the size of said solder balls.

37. The method of claim 34 where the angle between said first element and said second element is controlled by providing a lip on said first element and where said angle is controlled by the height of said lip.

* * * * *